United States Patent [19]

Östling et al.

[11] 4,159,828
[45] Jul. 3, 1979

[54] SEALING DEVICE

[75] Inventors: Sture Östling; Stig Persson, both of Katrineholm, Sweden

[73] Assignee: Aktiebolaget SKF, Goteborg, Sweden

[21] Appl. No.: 854,725

[22] Filed: Nov. 25, 1977

[30] Foreign Application Priority Data

Dec. 23, 1976 [SE] Sweden ................................. 7614503

[51] Int. Cl.² .......................... F16J 15/32; F16J 15/24
[52] U.S. Cl. ..................................... 277/184; 277/186; 277/152; 277/165
[58] Field of Search .................. 277/37, 35, 48, 49, 277/50, 152, 153, 165, 166, 181, 182, 184, 186, 189, DIG. 4

[56] References Cited

U.S. PATENT DOCUMENTS

| | | | |
|---|---|---|---|
| 1,902,620 | 3/1933 | Cobb | 277/182 X |
| 1,941,025 | 12/1933 | Stein | 277/184 |
| 2,073,768 | 3/1937 | Victor et al. | 277/182 |

FOREIGN PATENT DOCUMENTS

| | | | |
|---|---|---|---|
| 109100 | 11/1939 | Australia | 277/186 |
| 171596 | 6/1952 | Austria | 277/184 |
| 463564 | 4/1937 | United Kingdom | 277/DIG. 4 |
| 472509 | 9/1937 | United Kingdom | 277/182 |

*Primary Examiner*—Robert S. Ward, Jr.
*Attorney, Agent, or Firm*—Eugene E. Renz, Jr.

[57] ABSTRACT

A device for sealing the space between two surfaces comprising an elongated body portion made of a flexible, resilient material such as rubber. The body portion engages in a recess in one of said surfaces. The sealing device further includes at least two rigid plate members seating in a recess in the body portion and having a portion projecting therefrom defining a channel and a sealing member mounted in said channel and projecting therefrom to engage the other of the sealing surfaces to be sealed.

4 Claims, 5 Drawing Figures

SEALING DEVICE

BACKGROUND OF THE INVENTION

The present invention refers to a sealing device for an interspace between two surfaces.

The invention is primarily intended to be used for the sealing of the interspace between a shaft and its through hole in a bearing housing, but other applications are of course possible.

In order to obtain a good sealing effect it is essentially that the sealing body engages the surfaces defining the interspace to be sealed off. If the surfaces are movable relative to each other the portion of the sealing body which engages the movable surface should consist of material which can be supplied with lubricant and which will cause no wear on the movable surface in order to avoid friction losses and wear which will reduce the sealing function. The seal should furthermore be resistant to mechanical and chemical influence and be as inexpensive as possible. For those portions of the sealing body which engage a movable surface a material which is highly flexible and/or self-lubricating or able to absorb large quantities of lubricant is generally used. Such materials, however, often have low strength and may, therefore, not be used for the sealing body in cases where interspaces of comparatively large height shall be sealed off and where the seal may be subjected to high stresses. In view of this, seals have been designed, which incorporate portions of different material, e.g. a combination of metal and rubber. Such seals are rather complex and, therefore, expensive to manufacture, which is further stressed by the fact that their rigidity entails that interspaces of different size and shape will require different seals. This has a negative influence on the possibility of producing seals in long series, which could reduce the cost.

SUMMARY OF THE INVENTION

The purpose of the present invention is to provide a sealing device which has good sealing and strength properties and which can be manufactured from components which mostly can have a standardized shape and can be assembled into a sealing body in a simple manner.

This is according to the invention achieved thereby that the sealing device is given the features defined in the appended claims.

A sealing device according to the invention incorporates elements, which can be produced by cutting suitable lengths from a strip-formed initial material. These elements are assembled together with plates which e.g. can be punched out of steel bands. No tools and no especial connection means are required at the assembly.

DESCRIPTION OF THE DRAWING

The invention will hereinafter be further described with reference to the accompanying drawing.

DESCRIPTION OF THE PREFERRED EMBODIMENTS

Figure 1:
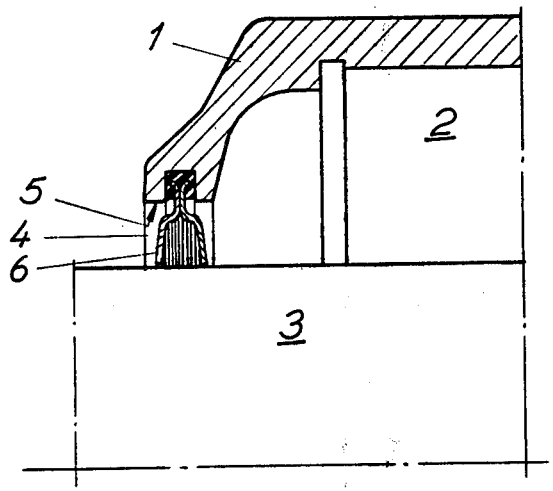
FIG. 1 shows a longitudinal section through an embodiment of the sealing device according to the invention disposed in an interspace between the bore of a bearing housing and a shaft extending through the bore.

FIG. 1 shows a part of a bearing housing with a bearing seat 2. A shaft 3 is supported by a bearing, not shown, in the bearing seat 2 and extends through a bore 4 in the wall of the housing. The interspace defined between the envelope surface of the shaft 3 and the surface 5 which defines the bore 4 is sealed off by means of a sealing body 6 which engages the surface 5 in a groove formed therein, and the envelope surface of the shaft 3. The sealing body 6 is thus annular and covers the entire interspace around the shaft.

Figure 2:
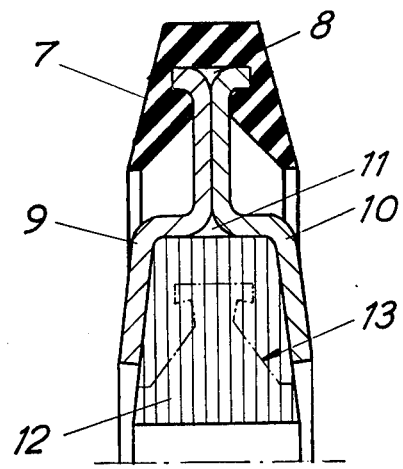
FIG. 2 is a section of the sealing device according to FIG. 1 in larger scale.

FIG. 2 shows the sealing body according to FIG. 1 in larger scale. It incorporates a flexible, elongated body 7, preferably formed as a rubber strip, with a constant cross-sectional shape along its entire extension. The body 7 has a longitudinal recess 8 and such a form that it, when compressed, can be pushed into the groove in the surface 5 (FIG. 1). Two plates 9, 10 having a form corresponding to at least a part of the form of the interspace between the shaft 3 and the surface 5 and with such a profile that they can be pushed into the recess 8, have been pushed into said recess and are steadily positioned therein when the body 7 is pushed into the groove in the surface 5. The plates in this position form a channel 11 between themselves. In this channel 11 is mounted a sealing member, which engages the envelope surface of the shaft 3 (FIG. 1), when the sealing device is mounted. The sealing member can consist of e.g. a felt ring 12, shown in continuous lines or it can be an element of the same material as, and having the same profile as, the body 7 which is shown in a dash and dot line 13.

Figure 3:
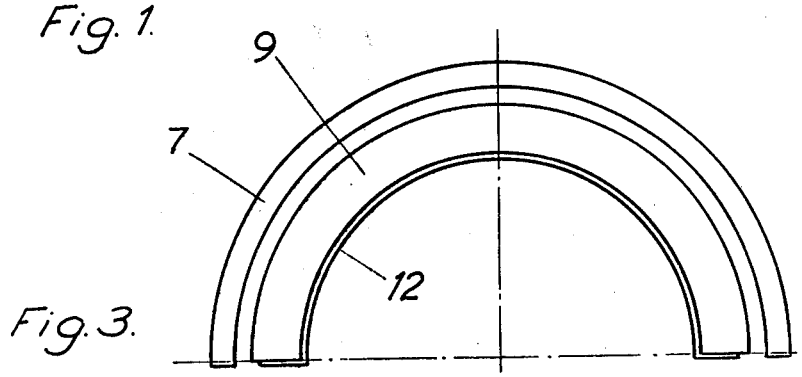
FIG. 3 shows a view of an embodiment of a part of the members forming part of the sealing device in assembled state.

In cases where the sealing device is intended for an annular interspace around a through-shaft, such as shown in FIG. 1, it is from assembly aspects preferable that the sealing body consists of two halves, each one of which encloses half the circumference of the shaft, the ends of the halves thereby engaging each other in a diametrical plane through the shaft. FIG. 3 shows a view of such a sealing body half incorporating a body 7, a plate 9 and a sealing member 12 in accordance with the reference numbers in FIG. 2.

A sealing body according to FIG. 2 provided with a sealing member such as suggested with the line 13 incorporates two different elements only, i.e. profile strips of rubber or the like of different lengths and plates of identical form. The plates can be made of metal, e.g. steel, or another suitable material, such as plastics.

Figures 4, 5:
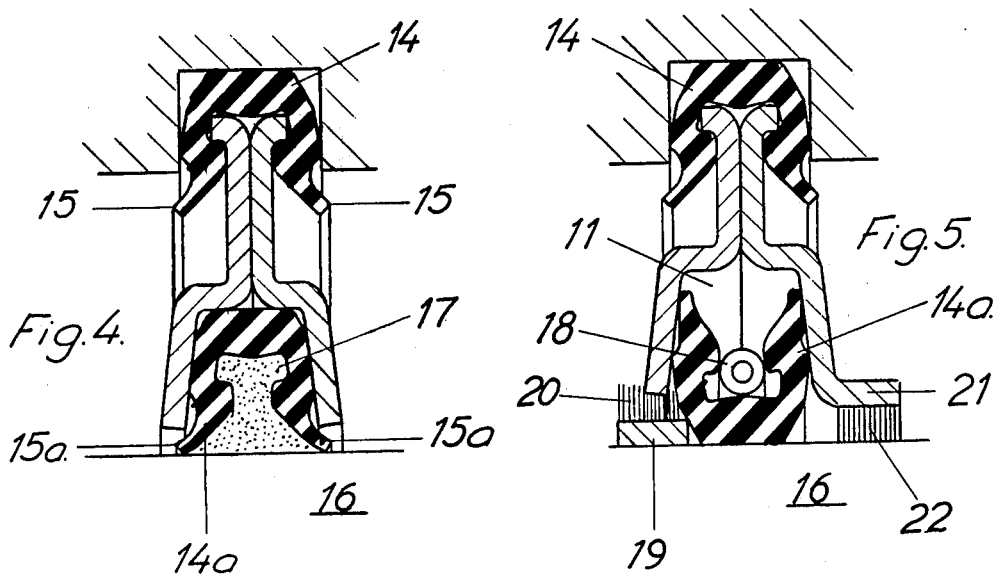
FIGS. 4 and 5 show sections corresponding to FIG. 2 of further possible embodiments of the sealing members forming part of the sealing device.

FIGS. 4 and 5 show some other possible embodiments of the elements forming part of a sealing body basically as the sealing body 6 of FIG. 1.

The embodiment according to FIG. 4 differs from what is shown in FIG. 2 mainly therein that the body 14, 14a is made with especial sealing lips 15, 15a intended to contact a surface 16, e.g. the envelope surface of a shaft. The recess 17 in the body 14a contacting the surface 16 is preferably filled with a lubricant in those cases where the surface 16 is movable relative to the body 14a.

In FIG. 5 is shown another possible mounting of the body 14a. This body can be clamped to the surface 16 e.g. by means of a spring 18, the sealing lips 15a thereby engaging the walls of the plates, which between themselves define the channel 11. The channel 11 can in these cases be filled with a lubricant.

By making particular arrangements at the edge portions of the plates it is possible to improve the sealing effect at this embodiment. A ring 19 can for instance be provided around the surface 16, which ring is equipped with sealing brushes 20, adapted to contact the edge of the left plate. The edge portion of the plate may alternatively be bent outwards to form a cylindrical portion 21, the inner surface of which is provided with sealing brushes 22 contacting the surface 16, such as shown at the right hand plate. FIG. 5 furthermore shows that plates of different profiles can be used at one sealing body, but it is considered that it is usually preferable to use only one type of plate at each separate sealing body.

Other embodiments than those described hereabove are also possible within the scope of the claims. The sealing body can for instance extend axially for sealing off a radial slot between two surfaces. It is furthermore not necessary that the two surfaces are movable in relation to each other, and the movement, if any, must not necessarily be a rotational movement. The bodies 7, 14 may not necessarily be mounted in a groove in one of the surfaces, if it is given such a rigidity that the plates 9, 10 are sufficiently positioned anyway.

We claim:

1. A sealing device for an interspace between two surfaces, characterized thereby, that it incorporates a flexible, elongated body (7, 14) with a longitudinal recess (8), which body is intended firmly to engage against a first one of said surfaces, two plates (9, 10) having a form corresponding to the form of at least a part of said interspace and such profiles that they on one hand can be pushed into the said recess in said body for mutual positioning and on the other hand when pushed into said recess in said body between themselves define a channel (11), and a sealing member (12, 14a) intended to be fitted in said channel, in such a manner that it in the assembled position of the sealing device engages against the second one of said surfaces.

2. A sealing device according to claim 1, characterized thereby, that one of said surfaces (5) is provided with a groove for the flexible, elongated body, said body and said groove thereby having such shapes that the body is compressed by the side surfaces of the groove when mounted in the groove.

3. A sealing device according to claim 1 for an annular interspace between a bore (4) in a housing and a member (3) disposed in the bore, characterized thereby, that the interspace is bridged by two flexible, elongated bodies (7, 14) each of which is arranged to enclose half of the circumference of said member and provided with two plates (9, 10) having a form corresponding to the form of each half of the interspace, and a sealing member (12, 14a) disposed in a channel between the plates, the ends of the bodies, the plates and the sealing members thereby being adapted to engage each other in a diametrical plane through the member (3) disposed in the said bore.

4. A sealing device according to claim 1, characterized thereby, that the sealing members (14a) in the channel between the plates and the flexible body (14) wherein the plates are pushed in have the same profile and are made of the same material.

* * * * *